(12) United States Patent
Lesniak

(10) Patent No.: US 6,788,462 B2
(45) Date of Patent: Sep. 7, 2004

(54) ACHROMATIC CIRCULAR POLARIZER

(76) Inventor: Jon R. Lesniak, 1605 Byrnwood Dr., Madison, WI (US) 53716

( * ) Notice: Subject to any disclaimer, the term of this patent is extended or adjusted under 35 U.S.C. 154(b) by 26 days.

(21) Appl. No.: 10/039,218

(22) Filed: Jan. 3, 2002

(65) Prior Publication Data
US 2003/0123143 A1 Jul. 3, 2003

(51) Int. Cl.$^7$ ................................................ G02B 5/30
(52) U.S. Cl. .................... 359/494; 359/483; 359/485
(58) Field of Search ......................... 359/352, 487, 359/494, 483, 485, 350, 53, 73, 100, 256

(56) References Cited

U.S. PATENT DOCUMENTS

| | | | |
|---|---|---|---|
| 2,441,049 A | | 5/1948 | West |
| 3,692,385 A | * | 9/1972 | Gievers ..................... 359/247 |
| 3,972,587 A | | 8/1976 | Scheffer |
| 4,305,046 A | * | 12/1981 | Le Floch et al. ........... 372/106 |
| 4,702,603 A | * | 10/1987 | Augustyn ................... 356/493 |
| 5,528,393 A | * | 6/1996 | Sharp et al. ................. 349/74 |
| 6,055,053 A | * | 4/2000 | Lesniak ...................... 356/366 |
| 6,320,657 B1 | | 11/2001 | Aspnes et al. |
| 6,392,800 B2 | * | 5/2002 | Schuster ..................... 359/485 |

OTHER PUBLICATIONS

"Polarized Light" by William A. Shurcliff, Harvard University Press, Cambridge, MA, 1966, pp. 81–82, 101–103.

* cited by examiner

Primary Examiner—Drew A. Dunn
Assistant Examiner—Joshua L Pritchett
(74) Attorney, Agent, or Firm—Stiennon & Stiennon

(57) ABSTRACT

Light of multiple wavelengths passes through, in order, a plane polarizer, a ½ wave plate, a means for attenuating polarized light in a selected plane, and a ¼ wave plate. The ¼ wave plate and the ½ wave plate are selected for green light. The ½ wave plate induces an error for nongreen light which is twice the error which the ¼ wave plate would induce for a particular light wavelength but of opposite sign. The errors are reduced by ½ by attenuation by passing all wavelengths of light through glass air interfaces defined by a plurality of glass plates, angled at between about 45 and 55 degrees with respect to the optical axis. Light which is plane polarized for green light, and precorrected for every other wavelength is passed through the ¼ wave plate and all wavelengths are converted to circularly polarized light.

22 Claims, 3 Drawing Sheets

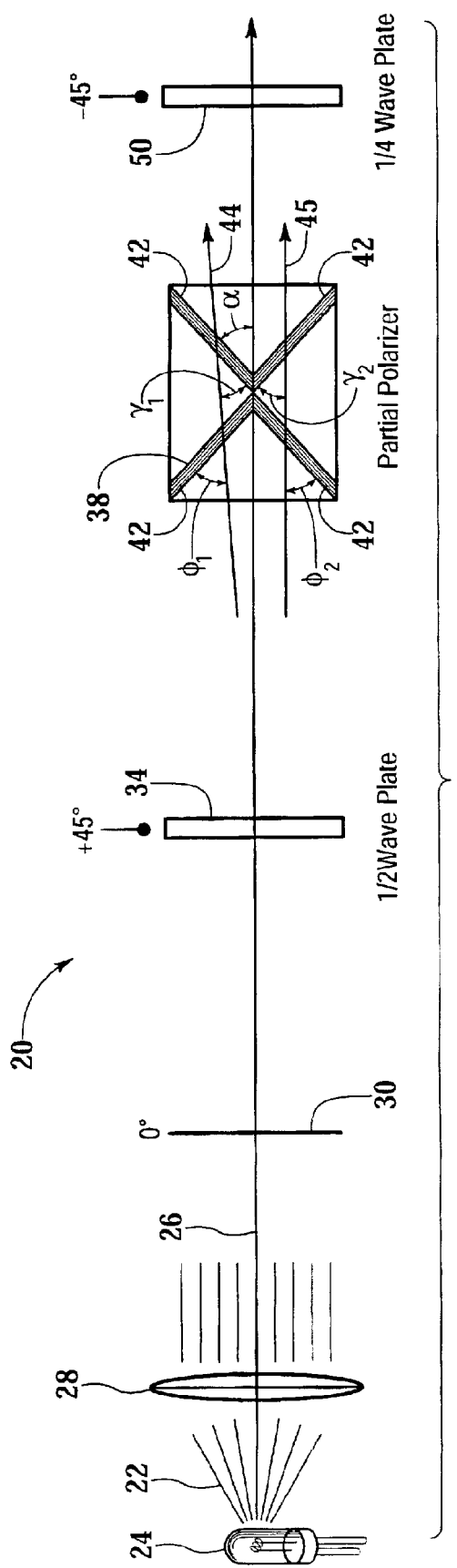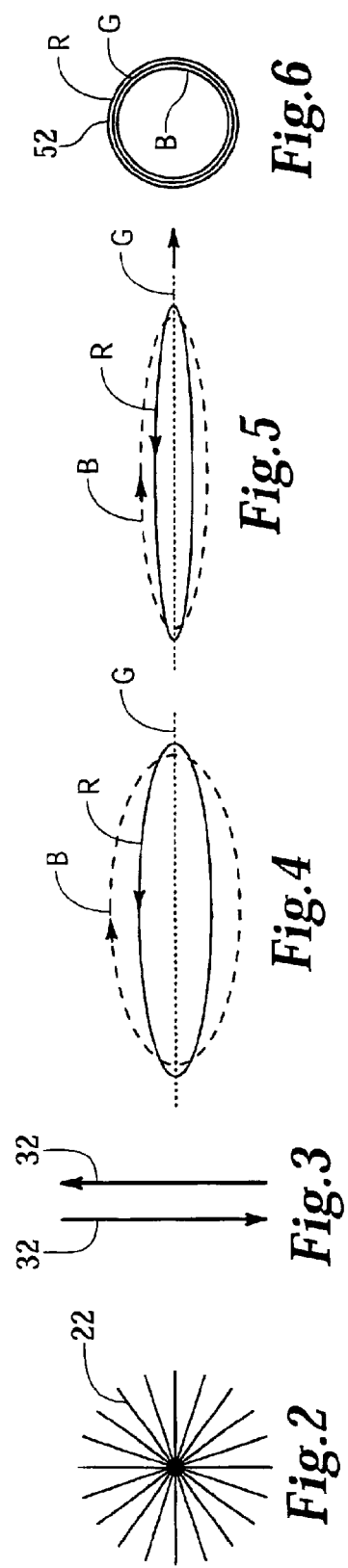

ACHROMATIC CIRCULAR POLARIZER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to optical elements for creating polarized light in general, and to optical elements for creating circularly polarized light in particular.

Circularly polarized light has many uses, particularly where it is desirable to gain the benefits of linearly polarized light, without the variability with viewing angles. Circularly polarized light may be used in ellipsometry, to study the properties of thin films. Moreover, according to my earlier inventions disclosed in U.S. Pat. Nos. 6,219,139 and 6,055,053, the disclosures of which are incorporated herein by reference, circularly polarized light can be used to detect shear stress magnitude and direction, in thin coatings on parts undergoing stress or in glass sheets and windows.

Circularly polarized light is generated by creating linearly polarized light with a linear polarizer and passing the resulting linearly polarized light through a ¼ wave plate perpendicular to the principal optical axes and rotated with respect to the plane of polarization by forty-five degrees. A ¼ wave plate is an optical element which causes the light vibrating in a first optical plane to experience a ¼ wavelength delay as compared to light passing through a second optical plane perpendicular to the first optical plane.

A minimum delay, or fast, axis is defined for a birefringent material along which light passes through the material with minimum delay. A maximum delay, or slow, axis is defined along an axis perpendicular to the axis of minimum delay, along which light is subjected to the maximum retarding effect.

Index of refraction is defined as the ratio between the speed of light in a vacuum and the speed of light in a material. In certain materials the index of refraction, that is the speed with which light travels through the material, depends on the orientation of the vibrational plane of the light with respect to orientation of the atoms making up the material. For example, when ordinary light passes through a calcite crystal along a particular crystallographic axis the strong birefringence exhibited by the crystal resolves the light into two polarized images. These images are spatially separated because the light which is experiencing the higher index of refraction experiences greater refraction.

Circularly polarized light is plane polarized light where the plane of polarization rotates about a line parallel to the direction of propagation of the light. Circularly polarized light can also be thought of as polarized light where the orientation of the plane of polarization has a probability function evenly distributed about the direction of propagation of the light. Thus when circularly polarized light is viewed through a plane polarizing analyzer only a component of the circularly polarized light will pass through the analyzer producing a neutral grey to the observer.

When plane polarized light encounterers a second plane polarizing filter, the intensity of light which passes through the second filter is proportional to the cosine of the angle between the axis of the polarized light and the axis of the polarizing filter. When circularly polarized light encounterers a plane polarizing filter, the amount of light which passes through the polarizing filter is independent of the orientation of the filter and can be viewed as the summation of all possible orientations times the cosine between each possible orientation and the axis of the polarizing filter. This results in the same light intensity as if the circularly polarized light were plane polarized and oriented forty-five degrees from the axis of the polarizing filter.

However, although a plane polarizer produces plane polarized light with respect to every frequency or color of light, a ¼ wave plate only produces circular polarized light with respect to a single wavelength or color of light, because the wave plate causes a delay along the slow axis which is the same for every wavelength but which is equal to a quarter of a wavelength only for a single selected wavelength or color of light. Where the light has a longer wavelength than the selected wavelength, the light produced is elliptically polarized with the major axis of the light parallel to the plane of the polarized light. Where the light has a shorter wavelength than the selected wavelength, the light produced is elliptically polarized with a major axis of the line perpendicular to the plane of the polarized light.

Achromatic circular polarizers are known, for example a Fresnel rhomb, which is a specially shaped rhomb of glass that totally internally reflects a beam of light twice. The Fresnel rhomb is nearly achromatic, but has drawbacks as regards to bulk and cost. A combination of plastic films such as described in U.S. Pat. No. 2,441,049 can be used to produce achromatic circularly polarized light, however such a combination may not be stable over time and the cellulose nitrate used in the combination may constitute a fire hazard. Stacked multiple crystalline plate systems are described, for example by Pancharatnam, in Proc. Indian Acad. Sci A 41,130 and 137 (1955), however, these achromatic circular polarizes are expensive and of limited aperture. What is needed is a low cost method of fabricating an achromatic circular polarizer with a large aperture.

SUMMARY OF THE INVENTION

The achromatic circular polarizer of this invention comprises optical elements spaced along a defined optical axis, beginning with a plane polarizer, defining a plane of polarization, followed by a ½ wavelength plate oriented with the principal optical axes at forty-five degrees to the defined plane of polarization, followed by a plurality of glass-air interfaces, formed by a plurality of glass plates, which are angled between about 45 and 55 degrees with respect to the optical axis. Finally a ¼ wave plate is positioned after the plurality of glass plates, perpendicular to the optical axis and oriented with the principal optical axes oriented minus forty-five degrees to the defined plane of polarization, and thus opposite in orientation to the ½ wavelength plate. The wavelength of the ¼ and ½ wave plates, is preferably selected for green light. As light of a wavelength which differs from green light passes through the ½ wave plate it acquires an error which is twice the magnitude, and opposite in sign, of the error which the same wavelength will acquire when passing through the ¼ wave plate. Polarized light which vibrates parallel to the plane 48 as shown in FIG. 9 is attenuated by the glass plates 40 of the partial polarizer 38. The number of and angle of the glass plates 40 is selected to reduce the error in half. The light thus corrected passes through the ¼ wave plate, where the polarized light at the green wavelength is converted to circularly polarized light, and the light at other wavelength, having been precondition with an error which is opposite in sign (direction) to the error induced by the ¼ wave is converted to circularly polarized light. This optical train thus forms an achromatic circular polarizer.

It is an object of the present invention to provide an achromatic circular polarizer of low cost.

It is a further object of the present invention to provide an achromatic circular polarizer which can easily be constructed with a large viewing aperture.

It is another object of the present invention to provide an achromatic circular polarizer which can be readily adjusted.

Further objects, features and advantages of the invention will be apparent from the following detailed description when taken in conjunction with the accompanying drawings.

BRIEF DESCRIPTION OF THE DRAWINGS

FIG. 1 is pictorial schematic view of the achromatic circular polarizer of the invention.

FIG. 2 is a pictorial view of ordinary light.

FIG. 3 is a pictorial view of plane polarized light.

FIG. 4 is a pictorial view of red, green, and blue light after passing through the ½ wave plate of FIG. 1.

FIG. 5 is a pictorial view of red, green, and blue light after passing through the ½ wave plate, and the partial polarizer of FIG. 1.

FIG. 6 is a pictorial view of red, green, and blue light after passing through the ½ wave plate, and the partial polarizer, and the ¼ wave plate of FIG. 1.

DESCRIPTION OF THE PREFERRED EMBODIMENTS

Figure 7:
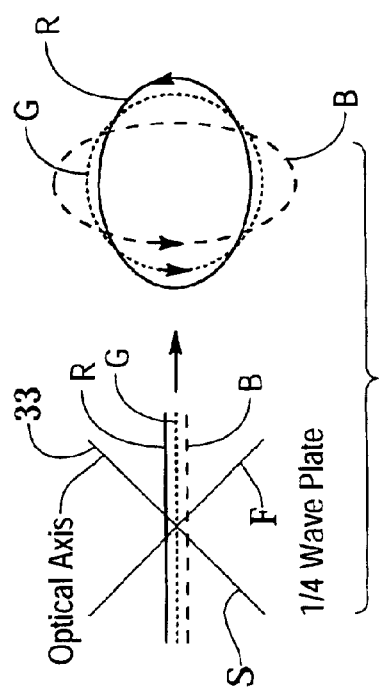
FIG. 7 is a pictorial schematic view of the result of passing red, green, and blue light through a green light ¼ wave plate.
Figure 8:
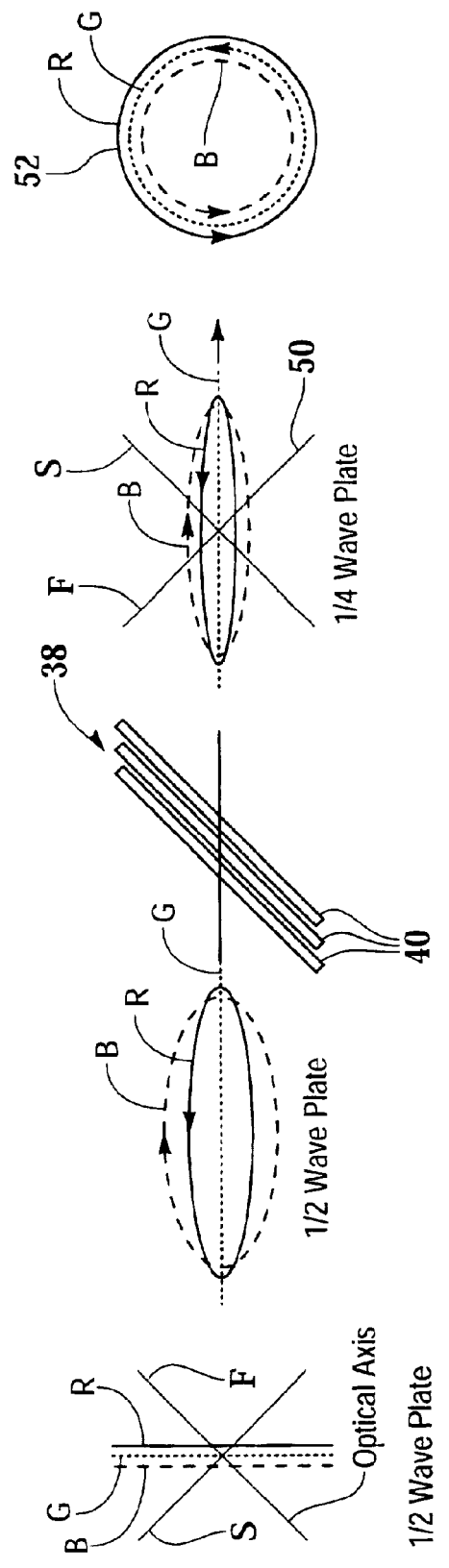
FIG. 8 is a pictorial schematic view of red, green, and blue light as they pass through the optical elements of FIG. 1.
Figure 9:
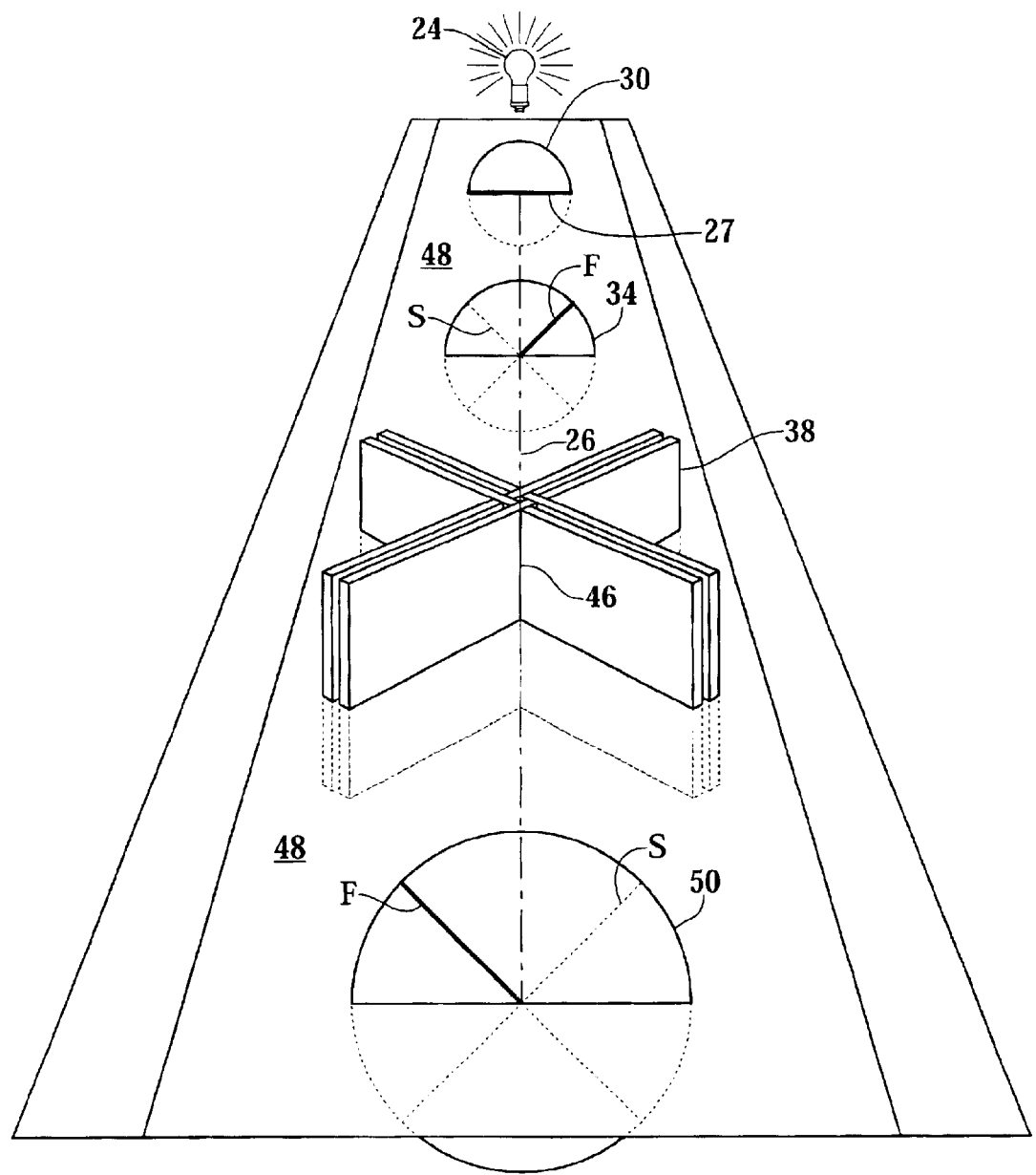
FIG. 9 is a perspective view of the achromatic circular polarizer of FIG. 1, without the condensing lens, showing the orientation of the optical elements.

Referring more particularly to FIGS. 1–9, wherein like numbers refer to similar parts, an achromatic circular polarizer 20 is shown in FIG. 1. White light 22 from a light source 24 is directed along an optical axis 26 by a condensing lens 28. The white light 22 vibrates in all planes as illustrated in FIG. 2. The white light 22 is passed through a plane polarizer 30 which is perpendicular to the optical axis 26 at a defined orientation 27, as shown in FIG. 9, of the zero degrees, to create plane polarized light 32. FIG. 3 illustrates that only the component of white light which vibrates in a single plane passes through the plane polarizer 30. The plane polarizer 30 produces plane polarized light of all frequencies which are present, particularly those in the visible spectrum.

The effect of a ¼ wave plate on white light is illustrated in FIG. 7. If plane polarized light of varying wavelengths is passed through a ¼ wave plate 33, for green light oriented as shown in FIG. 7, the green light G will be circularly polarized. The red light R will be insufficiently affected, because the ¼ wave plate is less than a quarter wave length for red light, the blue light B will be over-affected because the ¼ wave plate is more than a quarter wave length for blue light as shown in FIG. 7. If the plane polarized white light 32 can be modified so that the green wavelength of light is unaffected and an error opposite in sign to the error produced by the green light ¼ wave plate is introduced for every wavelength, the resulting light would be circularly polarized for all colors.

A ½ wave plate 34 is oriented perpendicular to the optical axis 26 as shown in FIG. 9 and oriented with its fast axis F and slow axis S at forty-five degrees from the orientation of the plane of polarization 30 as shown in FIG. 9. In particular, the fast axis F is positioned forty-five degrees to the left, of the orientation of the polarization direction 27 of the plane polarizer 30 as shown in FIG. 9. The ½ wave plate 34 rotates the plane of polarization of the green light G by ninety degrees as shown in FIG. 4 and FIG. 8. Light waves B which are shorter then green light G are elliptically polarized with a clockwise rotation, while light waves R which are longer than green light G are elliptically polarized in a counter-clockwise direction, as shown in FIG. 4. The errors induced for every wavelength of light other than the green are of about twice the magnitude and of opposites sign as the errors caused by the ¼ wave plate 33 shown in FIG. 7.

A means for attenuating light 38 which is polarized in one direction and not light which is polarized in an orthogonal direction is used to decrease the correction, i.e. the error, introduced by the ½ wave plate 34 until it is exactly the same magnitude but is of opposite in sign or direction, to that which the ¼ wave plate 33 will introduce. It is well known that light reflecting from a surface of higher index of refraction such as glass or water becomes polarized. It is also known that a plane polarizer may be created by stacking a number of parallel sheets of glass at an angle to a beam of light. The light as it passes through each glass air interface has successively more light which vibrates perpendicular to the plane of incidence removed by reflection, leaving only light which is polarized parallel to the plane of incidence.

The plane of incidence is defined as the plane containing the beam and a normal to the surface of the glass where the beam of light intersects the glass plate. This effect is used to create a partial polarizer or means for attenuating light 38 as illustrated in FIG. 1 and FIG. 8.

Although a number of means for attenuating light 38 are possible, the use of multiple glass plates 40 has a number of distinct advantages. Glass plates 40 are low-cost. Moreover, a compact optical component may be formed when the glass plates 40, as shown in FIG. 1, are arranged with four identical sets 42 of glass plates positioned at the same angle with respect to the optical axis 26 in a shape like ><. This produces a compact optical component which compensates for off-axis rays 44. The off axis ray 44, as shown in FIG. 1, passes through a first set of glass plates 42 at an angle $\phi_1$ which is less than the angle $\phi_2$ for a ray 45 which is parallel to the optical axis 26; however, the off axis ray 44 passes through the second set of glass plates 42 at an angle $\gamma_1$ which is greater than the angle $\gamma_2$ for the ray 45 which is parallel to the optical axis 26.

For example, if the angle of the glass plates is forty-five degrees with respect to the optical axis and the off axis ray 44 is angled with respect to the optical axis 26 three degrees, the ray 44 will strike the first set of glass plates 42 at forty-two degrees, and the second set of glass plates 42 at forty-eight degrees. Since the change in reflection coefficient, i.e. the amount of light that is reflected in the direction which it is desired to attenuate, varies substantially linearly for angles between forty-two and forty-eight degrees, then the total attenuation, for the off axis ray 44 will be substantially identical to the ray 45 which is parallel to the optical axis 26.

The amount of partial polarization is dependent on the angle α which the glass plates 40 make with the optical axis 26. Each glass plate 40 is oriented at the angle α with respect to the optical axis and perpendicular to a plane 48 defined by the polarization direction 27 of the plane polarizer 30 and the optical axis 26. The green light G which is rotated 90 degrees by the ½ wave plate 34, so the plane of vibration of the green light is parallel to the line 46 where the glass plates 40 intersect as shown in FIG. 9, and is minimumly affected by passing through the glass plates 40 other than by some attenuation due to the opaqueness of the glass. Polarized light which is vibrating in a plane perpendicular to the line 46 intersects the glass plates 40 along the angle α of the glass plates with respect to the optical axis 26, and is attenuated by reflection from the glass surface.

The total amount of attenuation can be controlled by adjusting the angle α between about forty-five degrees and about 55 degrees, and by selecting the number of glass plates 40. Typically, seven or eight air glass interfaces are required at an angle of forty-five degrees, and three or four air glass interfaces are required at an angle of 55 degrees. Although angles smaller than forty-five degrees can be used, more sheets of glass are required and the size of the glass plates increase rapidly for a given aperture size. The Brewster's angle is the angle between the incident light beam and the plate at which the angle between the reflected light and the refracted beam is 90 degrees. For plate glass, the Brewster's angle is about 56 degrees. When the angle α exceeds the Brewster's angle a substantial amount of light in both planes is reflected. Small adjustments can be made by rotating the partial polarizer 38 above the optical axis 26. Rotation results in some attenuation in both axes, but, for small angles, such rotation serves mainly to adjust the magnitude error induced by the ½ wave plate 34.

After passing through the means for partially attenuating light 38, the light beam passes through a ¼ wave plate 50 oriented, as shown in FIG. 9, with the fast axis F to the right of the polarization direction 27 as viewed from the side of the ¼ wave plate, from which circularly polarized light is emitted. The ¼ wave plate thus produces circularly polarized light 52 for all colors. In order to assure a good match between the ½ wave plate 34 and the ¼ wave plate 50, three closely matched ¼ wave plates, may be used, with two ¼ wave plates used to form the ½ wave plate. Alternatively, three ½ wave plates may be used, with two ½ wave plates whose optical axes are rotated with respect to each other used to form the ¼ wave plate. More generally the final ¼ wave plate may be constructed from two retarder plates which are close to the desired amount of retardation, i.e. ¼ wave. Another approach is to add a weak birefringent element to either the ½ wave plate or to the ¼ wave plate to bring them into agreement. Although weak birefringent elements are not readily commercially available, they can be constructed from ordinary Plexiglas® transparent plastic which exhibits weak birefringence, the precise needed weak birefringent element being found by trial and error.

It should be understood that the optical system 20 is not limited to visible light, but, with suitable selection of infrared or ultraviolet dielectrics for the partial polarizer and suitable optical elements for the polarizer, ½ wave plate and ¼ wave plate, a broad band of light can be uniformly circularly polarized. The described system has been used to construct a circular polarizer that has less than one percent noncircularity.

It should be understood that the orientations of the fast axes F of the ½ wave plate and the ¼ wave plate, could be reversed. It should also be understood that light rays which diverge from the optical axis will have greater errors induced which, after attenuation, will compensate for the greater errors that such divergent light rays produce in the ¼ wave plate. Thus the optical system 20 is able to produce uniformly circularly polarized light when the system allows significant divergence because of its wide aperture and relatively short length. The polarizing filters and the wave plates are in the form of thin plastic films, and if a diffuse light source is used, such as a fluorescent light, no condensing lens is required, the overall optical system 20 may be relatively compact.

It should be understood that a means for attenuating light which is polarized in one direction and not light which is polarized in an orthogonal direction, might be created using various optical elements, for example a thin film could be developed which only partially polarizes light, or a tilted glass plate could be produced as a fresnel lens, which might have multiple coatings with varying indices of refraction.

It should be understood that optical elements might be varied from those shown and described but retain the following basic relationship of passing polarized light through a first optical wave plate which is effectively twice that of a second wave plate, and arranged with respect to the second wave plate, so wavelength-dependent errors are of opposite sign, with a means for attenuating one-half of the wavelength-dependent error introduced by the first wave plate positioned therebetween, so the second wave plate, produces achromatic polarized light.

It is understood that the invention is not limited to the particular construction and arrangement of parts herein illustrated and described, but embraces all such modified forms thereof as come within the scope of the following claims.

I claim:

1. An achromatic circular polarizer comprising:
   a polychromatic light source comprised of a plurality of light frequencies;
   a linear polarizer in light receiving relation to the polychromatic light source;
   a ½ wave plate for a selected wavelength of light, the ½ wave plate in light receiving relation to the linear polarizer, the ½ wave plate rotating the plane of the selected wavelength and creating elliptically polarized light for every wavelength of the polychromatic light source which is not the selected wavelength;
   a partial polarizer in light receiving relation to the ½ wave plate, the partial polarizer changing the eccentricity of the elliptically polarized light of every wavelength of the polychromatic light source which is not the selected wavelength to a value opposite in sign and equal to that produced by a ¼ wave plate; and
   wherein the ¼ wave plate is in light receiving relation to the partial polarizer, and wherein the linear polarizer, the ½ wave plate, the partial polarizer, and the ¼ wave plate are arranged so that the plurality of light frequencies passing through the linear polarizer, the ½ wave plate, the partial polarizer, and the ¼ wave plate, are each emitted as circularly polarized light.

2. The achromatic circular polarizer of claim 1 wherein the selected wavelength of light is chosen to occupy a middle position within the plurality of light frequencies.

3. The achromatic circular polarizer of claim 1 wherein the ½ wave plate comprises two superimposed ¼ wave plates.

4. The achromatic circular polarizer of claim 1 wherein the ¼ wave plate comprises a first retarder plate arranged with respect to a second retarder plate so as to form the ¼ wave plate.

5. The achromatic circular polarizer of claim 1 wherein the partial polarizer comprises a plurality of glass plates, forming a plurality of air glass interfaces which are inclined with respect to a direction defined by a light path between the ½ wave plate and the ¼ wave plate.

6. The achromatic circular polarizer of claim 5 wherein the linear polarizer, the ½ wave plate, and the ¼ wave plate are arranged along an optical axis, and wherein the glass plates make an angle with the optical axis of between about 45 and about 55 degrees.

7. The achromatic circular polarizer of claim 1 wherein the selected wavelength of light is green light.

8. The achromatic circular polarizer of claim 1 wherein the selected wavelength of light is in the infrared.

9. The achromatic circular polarizer of claim 1 wherein the selected wavelength of light is in the ultraviolet.

10. An achromatic circular polarizer comprising:
    a liner polarizer;
    a ½ wave plate for a selected wavelength of light, the ½ wave plate in light receiving relation to the linear polarizer;
    a partial polarizer in light receiving relation to the ½ wave plate; and
    a ¼ wave plate for the selected wavelength of light the ¼ wave plate in light receiving relation to the partial polarizer, wherein the liner polarizer, the ½ wave plate, the partial polarizer, and the ¼ wave plate are arranged so that a plurality of light frequencies passing through the linear polarizer, the ½ wave plate, the partial polarizer, and the ¼ wave plate, are each emitted as circularly polarized light, and wherein the linear polarizer, the ½ wave plate, and the ¼ wave plate are arranged along an optical axis, and further comprising at least a first set and a second set of glass plates, the first set making a first angle with respect to the optical axis, and defining a first series of planes, and the second set of glass plates being arranged to lie in planes which intersect tho first series of the planes at 90 degrees.

11. A method of circularly polarizing a polychromatic beam of light comprising the steps of:
    passing a polychromatic beam of light, composed of a plurality of wavelengths, through a first optical element, followed by a second optical element, followed by a third optical element, followed by a fourth optical element, the second optical element receiving the polychromatic beam of light from the first optical element, the third optical element receiving the polychromatic beam of light of the second optical element, and the fourth optical element receiving the polychromatic beam of light from the third optical element;
    wherein the first optical element polarizes the polychromatic beam, and the fourth optical element circularly polarizes the polychromatic beam, and the second optical element introduces a first wavelength-dependent error, for each wavelength of light in the polychromatic beam, which is twice as great, and of opposite sign as a second wavelength dependent error, which the fourth optical element produces for each frequency of light in the polychromatic beam, when combined only with the first optical element, the third optical element attenuating every nonzero wavelength dependent error in the polychromatic beam received from the second optical element by one-half, so that each wavelength, of the polychromatic beam of light is circularly polarized after passing through the fourth optical element.

12. The method of claim 11 wherein the polychromatic beam includes light of infrared frequencies.

13. The method of claim 11 wherein the polychromatic beam includes light of ultraviolet frequencies.

14. The method of claim 11 where the first optical element is a plane polarizer, the second optical element is a ½ wave plate in reference to a selected wavelength of light, the third optical element is a series of inclined glass plates, and the fourth optical element is a ¼ wave plate in reference to the selected wavelength of light.

15. An achromatic circular polarizer comprising:
    a linear polarizer defining a direction of polarization, and an optical axis perpendicular to the direction of polarization;
    a ½ wave plate, introducing a first wavelength-dependent error which is twice as great, and of opposite sign as a second wavelength dependent error, produced by a ¼ wave plate defined with respect to a selected wavelength, the ½ wave plate defined with respect to the selected wavelength, the ½ wave plate defining a fast optical axis and a slow optical axis, the ½ wave plate positioned perpendicular to the optical axis, and downstream from and in light receiving relation to the linear polarizer, the fast optical axis and the slow optical axis of the ½ wave plate being rotated 45 degrees in a first direction with respect to the direction of polarization;
    a means for reducing the first wavelength-dependent error to equal the second wavelength dependent error in magnitude, the means for reducing positioned along the optical axis downstream of and in light receiving relation to the ½ wave plate; and
    wherein the ¼ wave plate, defines a fast optical axis and a slow optical axis, the ¼ wave plate positioned perpendicular to the optical axis downstream from and in light receiving relation to the means for partial polarization, the fast optical axis and the slow optical axis of the ¼ wave plate being rotated with respect to the direction of polarization 45 degrees in a second direction opposite the first direction, so that light of varying wavelengths are circularly polarized by passage through the linear polarizer, the ½ wave plate, the means for partial polarization, and the ¼ wave plate.

16. The achromatic circular polarizer of claim 15 wherein the ½ wave plate comprises two superimposed ¼ wave plates.

17. The achromatic circular polarizer of claim 15 wherein the ¼ wave plate comprises a first retarder plate, arranged with respect to a second retarder plate so as to from the ¼ wave plate.

18. The achromatic circular polarizer of claim 15 wherein the partial polarizer comprises a plurality of glass plates, forming a plurality of air glass interfaces which are inclined with respect to a direction defined by a light path between the ½ wave plate, and the ¼ wave plate.

19. The achromatic circular polarizer of claim 18 wherein the linear polarizer, the ½ wave plate, and the ¼ wave plate are arranged along the optical axis, and wherein the glass plates make an angle with the optical axis of between about 45 and about 55 degrees.

20. The achromatic circular polarizer of claim 15 wherein the selected wavelength of light is in the visible.

21. The achromatic circular polarizer of claim 15 wherein the selected wavelength of light is in the infrared.

22. The achromatic circular polarizer of claim 15 wherein the selected wavelength of light is in the ultraviolet.

* * * * *